(12) United States Patent
Cartwright

(10) Patent No.: US 9,891,094 B2
(45) Date of Patent: Feb. 13, 2018

(54) WEIGHING SCALE SYSTEM WITH WEIGHING SCALE AND PORTABLE COMPUTER DEVICE

(71) Applicant: Kevin Cartwright, West Midlands (GB)

(72) Inventor: Kevin Cartwright, West Midlands (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 128 days.

(21) Appl. No.: 14/897,742

(22) PCT Filed: Jun. 9, 2014

(86) PCT No.: PCT/US2014/041461
§ 371 (c)(1),
(2) Date: Dec. 11, 2015

(87) PCT Pub. No.: WO2014/204687
PCT Pub. Date: Dec. 24, 2014

(65) Prior Publication Data
US 2016/0138962 A1    May 19, 2016

(30) Foreign Application Priority Data

Jun. 21, 2013 (GB) .................................. 1311128.1

(51) Int. Cl.
*G01G 19/414*    (2006.01)
*G01G 21/22*    (2006.01)
*G06Q 10/08*    (2012.01)

(52) U.S. Cl.
CPC ......... *G01G 19/4144* (2013.01); *G01G 21/22* (2013.01); *G06Q 10/087* (2013.01)

(58) Field of Classification Search
CPC ............... G06Q 10/087; G01G 19/414; G01G 19/4144; G01G 21/22
USPC ......................................................... 235/383
See application file for complete search history.

(56) References Cited

U.S. PATENT DOCUMENTS

| 6,604,681 | B1 | 8/2003 | Burke et al. |
| 6,644,547 | B1 | 11/2003 | White |
| 8,944,322 | B2 * | 2/2015 | White ................ G06K 7/10554 235/383 |
| 9,607,486 | B2 * | 3/2017 | Acker, Jr. ............ G07G 1/0081 |
| 2002/0194075 | A1 | 12/2002 | O'Hagan et al. |
| 2006/0238346 | A1 | 10/2006 | Teller |

(Continued)

FOREIGN PATENT DOCUMENTS

| CN | 1336052 A | 2/2005 |
| CN | 2697610 Y | 5/2005 |

(Continued)

OTHER PUBLICATIONS

PCT, International Search Report and Written Opinion, International Application No. PCT/US2014/041461, dated Sep. 19, 2014.

(Continued)

*Primary Examiner* — Randy Gibson
(74) *Attorney, Agent, or Firm* — Thompson Hine LLP

(57) ABSTRACT

A system incorporating a weighing scale in which information is presented to the user based on output of the weighing scale via a portable device and a database.

13 Claims, 5 Drawing Sheets

(56) References Cited

U.S. PATENT DOCUMENTS

| | | | |
|---|---|---|---|
| 2006/0293968 A1* | 12/2006 | Brice | B62B 3/1424 |
| | | | 705/14.63 |
| 2007/0043621 A1 | 2/2007 | Collins et al. | |
| 2007/0102512 A1 | 5/2007 | Doerwald | |
| 2008/0277168 A1 | 11/2008 | Doerwald | |
| 2009/0106085 A1 | 4/2009 | Raimbeault | |
| 2010/0000801 A1 | 1/2010 | Smith et al. | |
| 2012/0173351 A1 | 7/2012 | Hanson et al. | |
| 2012/0284132 A1* | 11/2012 | Kim | G07G 1/0081 |
| | | | 705/20 |
| 2012/0346204 * | 12/2013 | Wissner-Gross | G06Q 30/0281 |
| | | | 705/14.58 |

FOREIGN PATENT DOCUMENTS

| | | |
|---|---|---|
| EP | 2199996 A1 | 6/2010 |
| EP | 2463631 A1 | 6/2012 |
| EP | 2485176 A2 | 8/2012 |

OTHER PUBLICATIONS

GB, Combined Search and Examination Report, United Kingdom Application No. 1311128.1, dated Aug. 14, 2013.

\* cited by examiner

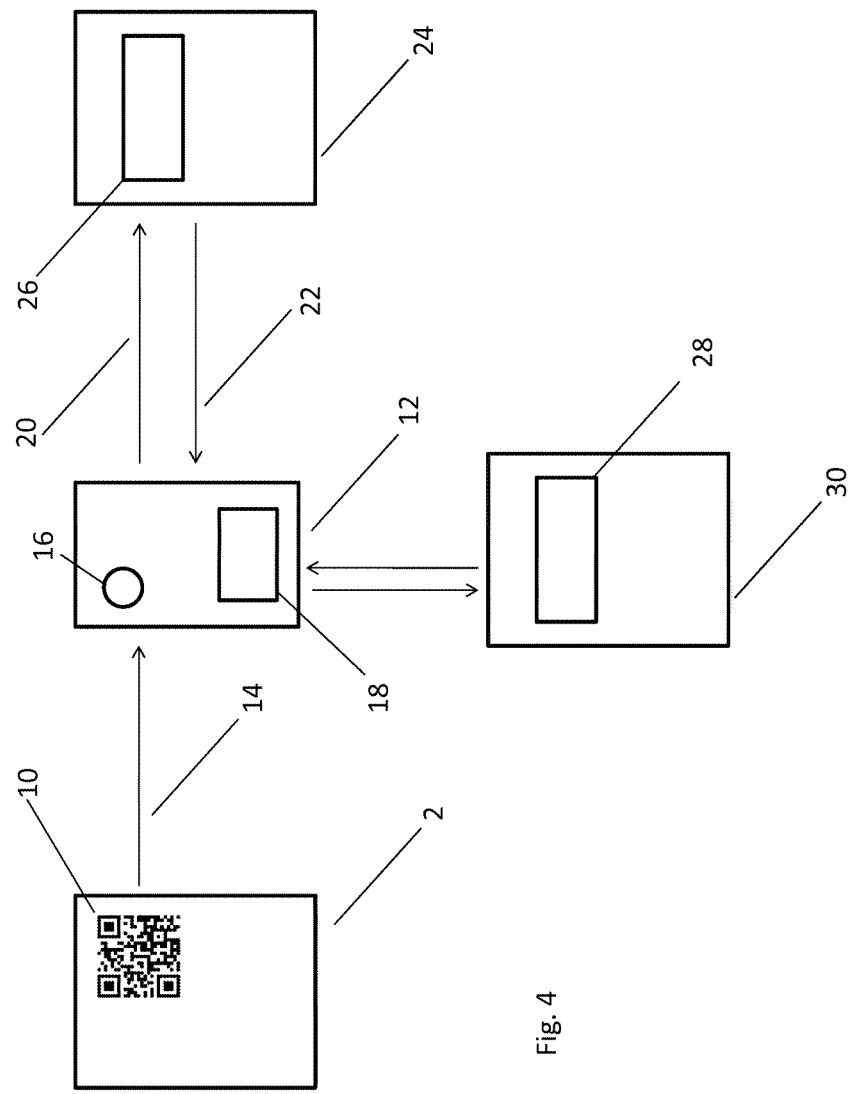

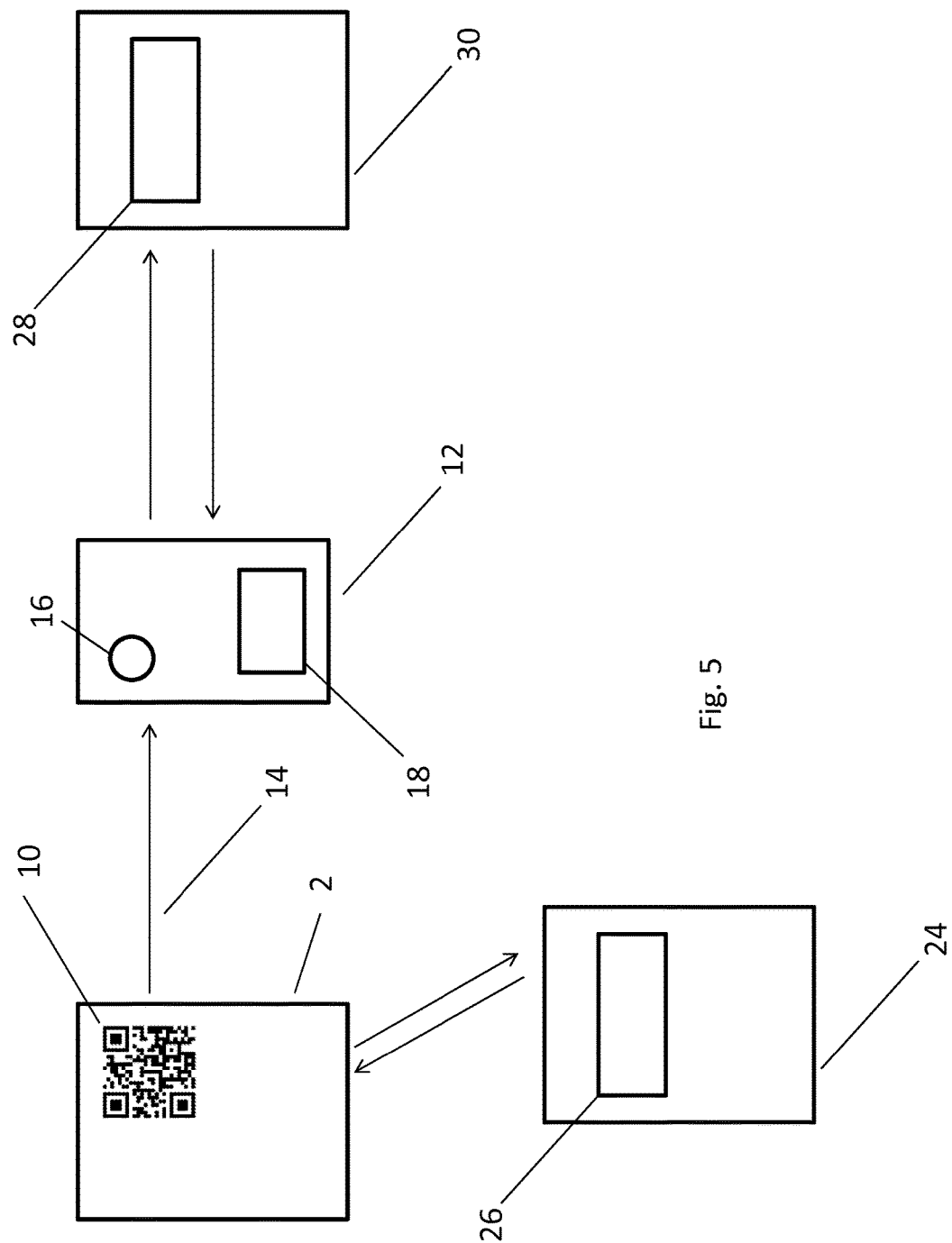

WEIGHING SCALE SYSTEM WITH WEIGHING SCALE AND PORTABLE COMPUTER DEVICE

CROSS-REFERENCE TO RELATED APPLICATIONS

This application is a National Stage filing of International Application No. PCT/US2014/041461, filed Jun. 9, 2014, which claims priority of United Kingdom Patent Application No. 1311128.1, filed Jun. 21, 2013, which are incorporated herein by reference in their entireties.

FIELD OF THE INVENTION

The invention relates to weighing scales, more particularly relates to a system in which a weighing scale is associated with a database or databases and communication between the database or databases and a portable computer system is established.

BACKGROUND

Weighing scales are a common feature in food shops and supermarkets in which goods are sold by weight. In addition to scales operated by supermarket staff, self-service scales may be provided for operation by customers. Existing self-service scales may provide additional information aside from merely measuring the weight of foodstuffs placed on them; for example, they may also provide the total cost of the product(s) weighed, identify specific products through scanning optical codes or through user input, and/or accept payment for the products in question.

However, customers in a food shop may have requirements beyond merely weighing out some goods and paying for them. Customers may be interested in suggestions for meals in which a product may be served or recipes for the preparation of the food they have purchased. They may also seek recommendations for foods or drinks that may pleasingly accompany the product they are weighing out, and so on. In addition, many supermarkets encompass a large area in which it may be difficult or time-consuming for customers unfamiliar with the store layout to find recommended products unless they receive some guidance.

Typically, supermarkets provide human staff in order to provide these services. Human staff may answer questions above and beyond the weight and pricing of goods—for example, they may suggest means of preparing foods or recipes using the ingredients weighed, along with other foods required to complete said recipes—and they can also accompany shoppers as they move around a shop floor to help them find the additional foods needed for meal recipes. However, providing human staff in attendance on each self-service weighing scale would not only be expensive, it would also defeat the purpose of having self-service scales in the first place.

There is therefore an ongoing need for weighing scales which can provide additional information in a portable form.

SUMMARY OF INVENTION

The invention relates to a system and a method for using said system. The system in question at its simplest comprises a weighing scale, a store-associated database, and a portable computer device in communication with the store-associated database. The database is store-associated in the sense that it is a database produced and managed by the store the weighing scale is disposed in, or by a franchise or chain of stores of which the store the weighing scale is disposed in is a part, or by a third party providing this service to the store or franchise or chain in question, and that the database is generated from information provided by the store or franchise or chain. Suitable portable computer devices include, but are not limited to, mobile telephones, tablet computers, laptops, or computing devices worn on the body. Optionally, the system may also include an indoor positioning system installed in the place where the scale in installed.

Preferably, the portable computer device is also in communication with the scale. Means by which this may be accomplished may involve optical codes or machine-readable texts (many extant portable computer devices comprise cameras capable of scanning such optical means of data input), or a wireless communications protocol (such as Bluetooth, near field communication or "wi-fi"). Where communication is accomplished via optical codes or machine-readable texts this can be accomplished by displaying the codes or text on a display device comprised in the scale.

The invention allows for the store-associated database to be stored on a remote server as an option. Communication between the store-associated database and the portable computer device in such a situation can be accomplished in a variety of ways, for instance via telecommunications network, or an internet connection, or a wireless communications protocol.

The invention also relates to a method of using systems as described above. These methods would entail firstly a step of weighing a product on the scale and inputting data on the type of product into the scale (for example, by scanning a barcode or selecting an option from the scale's display), secondly a step of communicating data based on the weight of product and type of product from the scale to the store-associated database; and thirdly a step of communicating data based on the data sent to the store-associated database from the store-associated database to a user of the system. Preferably, the data communicated to the user is communicated via the portable computer device.

Preferably, this data will include information on products associated with the product weighed. (For example, if the product weight is a foodstuff, the associated products may be ingredients in a recipe comprising the foodstuff in question—the specific recipe may be selected from a list of options by the user.) Such information preferably includes one or more of the following: the stocking status of associated products (whether the store the scale is installed in has the associated products in stock, or whether any nearby stores have the products in the event that one or more of the associated products is not in stock at the store the scale is installed in), or the amount of each of the associated products required to accomplish a goal (for instance, if the goal is to prepare a particular meal according to a recipe the amounts of each ingredient needed to accomplish this can be provided), or the location of associated products within the store the scale is installed in. Preferably, where the information to be provided includes the amounts of associated products required to accomplish a goal (such as preparing a meal according to a recipe), multiple goals capable of being accomplished with the product weighed may be presented to the user, allowing them to select the goal they desire information on. For instance, in the case of food recipes multiple different recipes or meals associated with a weighed food product could be presented to the user, multiple recipes could be offered. The user may select the recipe desired in various ways—for instance, the scale may display multiple optical codes corresponding to different recipes and the user could scan the optical code associated with the desired recipe, or the recipe could be chosen using controls (optionally including touchscreen controls) found on the scale or on the portable computing device. In such cases the user may also be prompted to specify a number of servings of the recipe desired (eg, "to feed 4 people") and the information proved could be scaled accordingly.

The data provided to the user may also comprise a map—for instance, a map of the store the scale is installed in indicating where associated products may be found, or a map of the local area indicating stores where associated products are in stock. The map may comprise an indication of the user's position and this may, where the map is a map of the store, be presented utilising data from an indoor positioning system where one is present.

Preferably and additionally to any of the above examples of the invention, the system may further comprise a user-associated database. The user-associated database is user-associated in the sense that it comprises data provided by the user either directly or through gathering data on the user's activities or purchases. This user-associated database is preferably associated with a stock-monitoring device in the user's possession.

(For instance, in the case of food shopping, the user-associated database may be associated with an "intelligent fridge" installed in a user's kitchen.) This allows data to be provided taking into account products already in the user's possession, even if those products are currently stored at a location remote from the site where the weighing scale is installed and without any necessity for the user themselves to recollect precisely what products they have available at home.

DESCRIPTION OF DRAWINGS

FIG. 4 illustrates an embellishment to the system of FIG. 2, wherein there is a user-associated database which is in communication with the portable computer device.

FIG. 5 illustrates an embellishment to the system of FIG. 3, wherein there is a user-associated database which is in communication with the portable computer device.

DETAILED DESCRIPTION

Figure 1:
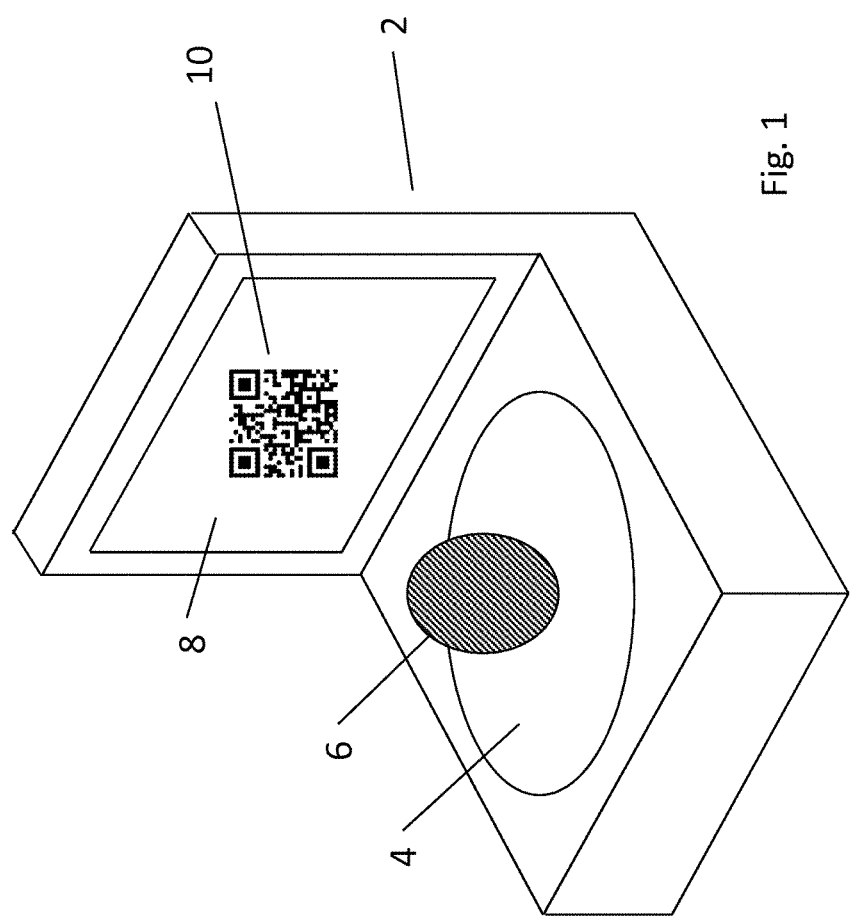
FIG. 1 illustrates a weighing scale according to the present invention.

FIG. 1 illustrates a weighing scale (2) according to the present invention. The weighing scale depicted comprises a weighing pan (4) on which an object to be weighed (6) is placed, which allows weight to be measured. Means of measuring weight using scales (2) as depicted in FIG. 1 include strain gauges, load gauges, and load cells, but it should be understood that any means of measuring weight or mass could potentially be used provided that it provides a measurement capable of input into systems according to the present invention.

The scale (2) is capable of determining the weight of an item (6) placed on the weighing pan (4). It is also capable of determining information on the type of item (6). This information may be obtained by the scale (2) through a number of means, including but not limited to the following:

The scale (2) may comprise a scanner capable of scanning a barcode, QR code, or other optical machine-readable medium, which the user of the scale (2) scans as part of the process of weighing the item (6) and which tells the scale what the item is.

The scale (2) may comprise optical recognition software capable of distinguishing between products.

The scale (2) may utilise its display (8) to solicit information from the user to specify what the item is.

The information determined by the scale (2) may also include the price of the item. This may depend on the weight of the item as measured by the scale (2), in which case the price may be calculated once the item (6) has been weighed.

The scale is capable of outputting data based on the information it determines. Some or all of this data may be presented in a human-readable format, for example on an output display (8) or on a printed receipt. (Suitable output displays include LCD screens, LED screens, plasma screens, cathode ray tube screens, and so on.) It is an essential requirement of systems according to the present invention that data based on the weight and type of product (6) is output to a store-associated database (26) in order to obtain information from said store-associated database. In some cases the scale (2) may be in direct communication with the store-associated database (26) (as is the case in the system depicted in FIG. 3). In other cases communication of data from the scale (2) to the store-associated database (26) is accomplished by first transferring information from the scale (2) to a portable computer device (12) (as is the case in the system depicted in FIG. 2). In the examples depicted in the figures this is accomplished by the output display (8) displaying an optical code (10), which can be read by a camera (16) on the portable computer device (12). The code depicted in the figures is a QR code, capable of being read by a range of portable computer devices (12), but any machine-readable code could be used provided that it can convey sufficient data to the portable computer device (12) to allow the device to acquire information from a store-associated database (26). Alternatively, the information may be provided in the form of machine-readable text capable of being interpreted via optical character recognition (OCR) via the camera (16).

Other means of transferring data from the scale (2) to the portable computer device (12) could be used as an alternative. For instance, data may be provided in the form of a printed receipt comprising the information and optical code (10) or machine-readable text which would otherwise have been displayed on the output display. Alternatively, direct data transmission of the data may occur between the weighing scale (2) and a portable computer device (12) used in the present invention—for example, via a wireless communication protocol (such protocols include, but are not limited to, wifi, near field communication or Bluetooth).

The portable computer device (12) is a computing device capable of communicating with the scale (2) and store-associated database (26). Examples of such devices include tablet computers, laptops, mobile telephones (in particular smartphones), and computing devices worn on the human body such as augmented reality glasses or smart wristwatches. The portable computer device comprises means of receiving data from the scale (2)—for instance, if data is transmitted directly via protocols such as Bluetooth, near field communication or wifi, the portable computer device will comprise equipment capable of utilising such protocols, whereas if data is transmitted via an optical means such as a code (10) the portable computer device will comprise a camera (16) for the purposes of scanning said code.

Data from the scale (2) is communicated to a store-associated database (26) in order to obtain more information. Although the store-associated database (26) may be stored on the portable computer device, it is preferable that this store-associated database (26) be stored remotely. An example of such an implementation of the invention would have the store-associated database (26) be stored on a server (24) accessed via the Internet or other telecommunications means or via a wireless communications protocol. The store-associated database (26) sends data based on the data it has received back for the attention of the user of the system. This data may be sent to the scale (2), and may be communicated from the scale (2) to the portable computer device (12) via the same means as outlined above (as is the case in FIG. 3). Preferably, the data sent by the store-associated database is sent directly to and displayed on the portable computer device (12) (as is the case in FIG. 2). Optionally, additional information from the store-associated database (26) can be obtained in response to data input solicited from the customer.

Preferably, a portable computer device (12) in this system should be capable of fulfilling the following tasks:

Receive data from the scale (2).

Communicate data based on data received from the scale (2) to the store-associated database (26).

Receive data provided in response from the store-associated database (26).

Display information based on the data received from the scale (2) and the data received from the store-associated database (26).

Optionally, display additional information based on requests or data input by the customer.

Preferably, this is achieved with the aid of a specialised application (18) installed on the portable computer device (12) (such applications often being referred to as "apps") specifically designed to perform one, some, or all of the above functions. This application (18) may be installed on the portable computer device (12) via various means. For instance, many portable computer devices (12) of the smartphone or tablet type offer interfaces through which users can search for and install onto their device applications they desire. Alternatively, the weighing scale (2) may transmit information on how to install the application (18), or indeed the application (18) itself, via means such as a machine-readable optical code, or through wireless communication protocols such as Bluetooth, near field communication or "wi-fi". Less preferably, no specialised application (18) is used and the functions associated with such applications are achieved using features already existing in the operating system of the portable computer device (12) or with a number of different applications. For example, the data may be received from the scale (2) by scanning a code (10) with a camera (16) and interpreted using software either comprised in the operating system of the portable computer device (12) or installed on the device by the user beforehand; the data may comprise a URL (uniform resource locator) comprising data to be communicated to the store-associated database (26) which, when loaded into a web browser installed on the portable computer device (12), causes the web browser to make a query to the store-associated database (26) and display information from it.

Figure 2:
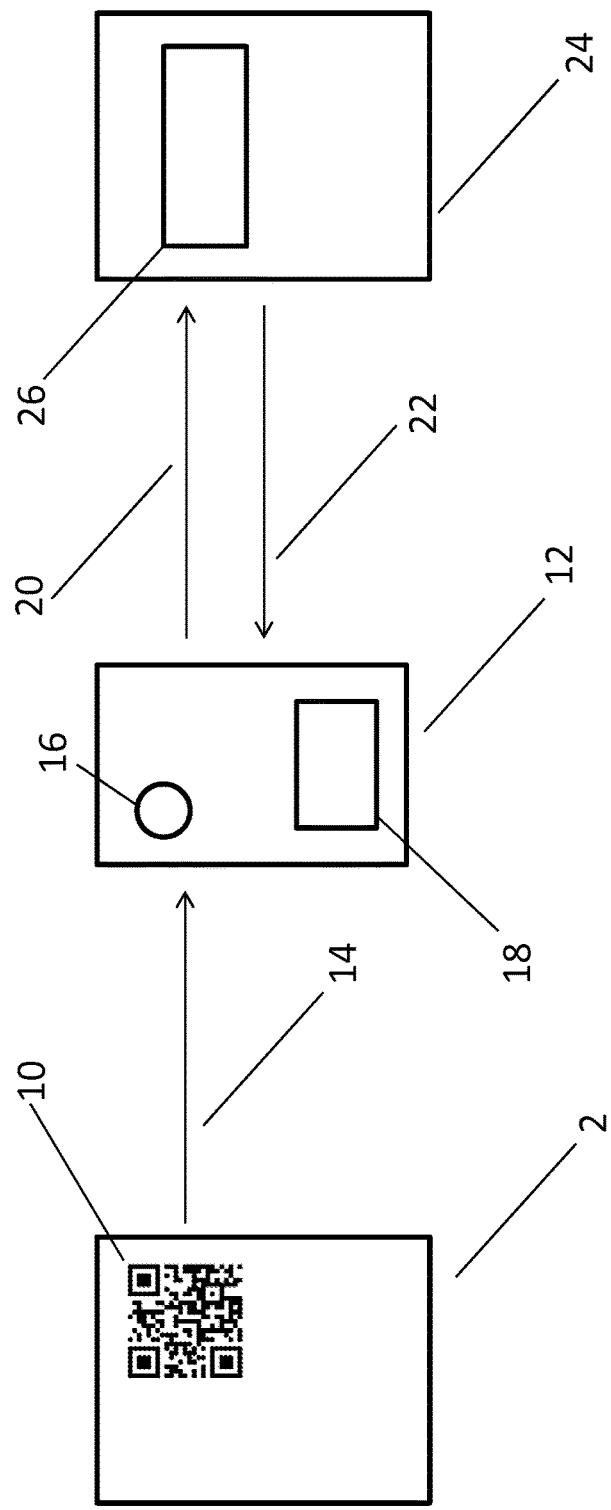
FIG. 2 illustrates a system in which information is communicated from the weighing scale to a portable computing device, and between the portable computer device and a store-associated database.

An example of how a system as outlined above incorporating many preferable features may be used in practice is shown in FIG. 2 and works as follows: a customer places a product (6) on the scale (2) which, for the purposes of this example, we shall assume is a foodstuff. The customer also provides input on the type of product (6) being weighed. (This input could, for example, involve scanning a barcode using a scanner on the scale (2), or selecting an option on the display of the scale (8).) The scale display (8) indicates what the product (6) is, indicates the weight of the product (6), and indicates the consequent cost of the product (6) weighs a certain weight and costs a certain price, and additionally displays an optical code (10), which is generated based on the nature of the item in question and its weight. The customer uses a portable computer device (12) comprising a camera (16) to scan the code (10), causing a communication of data (14) from the scale (2) to the portable computer device (12). An application (18) installed on the portable computer device (12) receives the data encrypted in the code (10) and communicates the data through an internet connection (20) to a store-associated database (26) on a remote server (24). Data from the store-associated database (26) is transmitted to the portable computer device (12) via an internet connection (22).

In this example, the data transmitted to the store-associated database (26) includes the fact that the customer has weighed a foodstuff, and provides the type of foodstuff weighed, as well as providing an indication of which store the customer is in. For the purposes of this example the database (26) comprises a set of recipes for meals comprising the product (6) weighed; these recipes are conveyed to the customer via their portable computer device (12), which they can use to select a recipe they wish and to note how many people they wish to feed. The recipe provides a list of ingredients for the meal which can be scaled either to the weight of the product (6) weighed, or to the number of people the customer wishes to feed. In the former case, the application (18) may notify the customer as to how many portions of the meal they can expect to obtain from product (6) they have weighed. In the latter case, the application (18) may warn the customer if they have not weighed a sufficient quantity of product (6) to produce the number of portions they require. In both cases, the application (18) notifies the customer of which other ingredients they require to make the meal and the quantity of each ingredient which will be needed.

The store-associated database (26) may have information on the items stocked at the store, and indeed may be in communication with computer systems at the store in order to keep track of levels of stock. Therefore, when other ingredients in the recipe may be purchased at the same store, the application (18) may notify the customer of this. The application (18) may also notify the customer of how much of each item the store has in stock. The application (18) may also suggest alternatives available from the store if a particular item is sold out, or if a particular ingredient is available in multiple different brands or package sizes. The application (18) may also provide a map of the store indicating where each item is shelved. Where such a map is provided the application (18) may also indicate the current position of the customer within the store (if, for instance, the store has installed in indoor positioning system capable of communication with the customer's portable computer device (12)). In the event that the store is out of stock of a particular item, said item may be available in other stores whose stock systems are accessible to the store-associated database (26); in this case, the application (18) may provide a map indicating where the nearest store known to the store-associated database (26) which has the item in stock is.

It will be evident to the skilled person that the particular example above is just one possible application of systems according to the present invention. For instance, the invention is not necessarily limited to foodstuffs—for instance, a similar system could be in place whereby when craft or DIY materials are weighed the database provides suggestions for projects which can be accomplished with the materials in question, as well as suggestions for related products. (For example, if a can of paint is weighed by the scale (2) then the store-associated database (26) could return information on projects that could be accomplished with the paint, as well as information on related products such as paintbrushes.) Within the scope of food shopping there is a wide range of information which could be provided via the system in question aside from recipes—for instance, dietary information can be provided for the benefit of customers who have special dietary requirements or who are attempting to follow a diet in order to lose weight, and alongside such information healthy alternatives which are in-stock in the store in question could be proposed.

Figure 3:
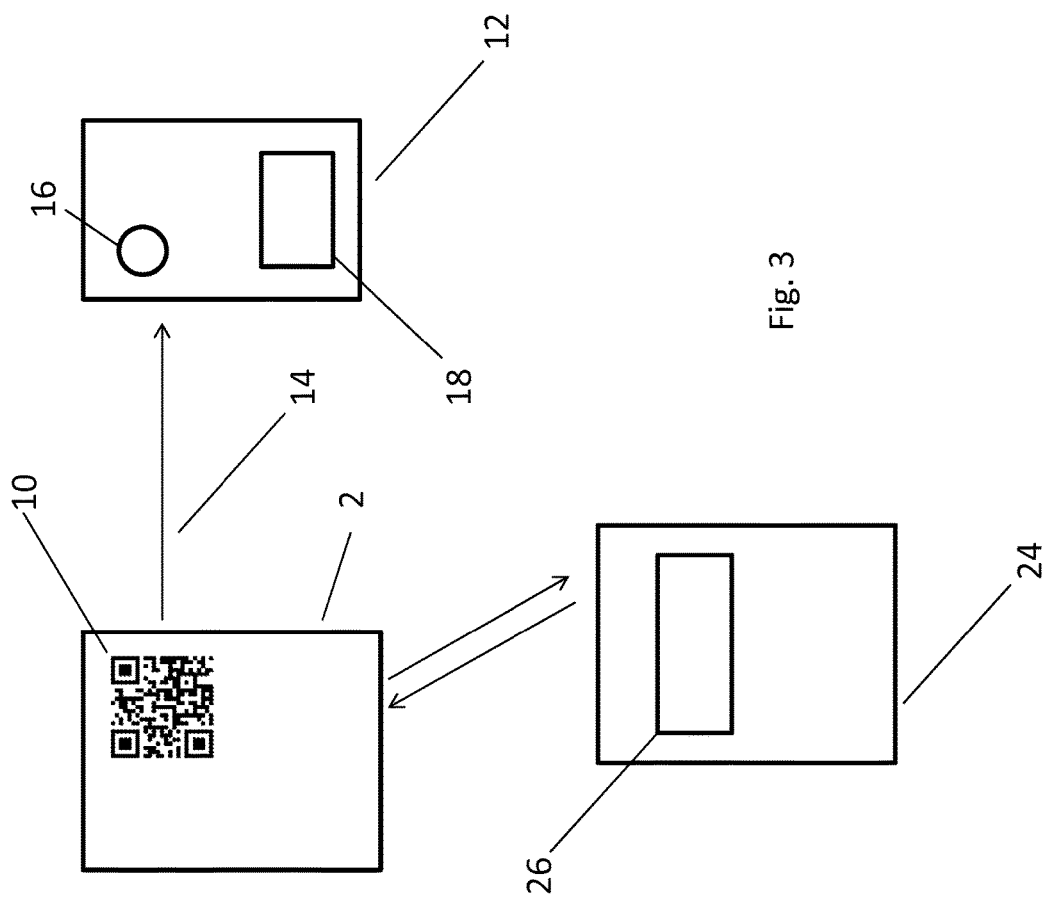
FIG. 3 illustrates a system in which information is communicated between the weighing scale and the store-associated database, and is then communicated to the portable computing device.

In an alternative method to the example depicted the scale (2) may communicate directly with the store-associated database (26) in order to obtain the information desired, which may then be transferred to the portable computer device (12) either from the store-associated database (26) or from the scale (2). For example, if the user has an individual account on the database associated with their portable computer device (12) the store-associated database (26) may be configured to transmit information to the portable computer device (12) via the Internet or a telecommunications network or a wireless communications protocol on receipt of information from the scale (2) when the user provides relevant identification credentials to the scale (2). Alternatively, the display of the scale (8) could display an optical code or machine-readable text based on data received from the database in addition to the data on the weight and type of item weighed on the scale, and on scanning said code or text with the camera (16) of the portable computer device (12) the portable computer device (12) could display the information, as is depicted in FIG. 3.

FIGS. 4 and 5 depict two of many possible implementations of a further embellishment of the invention which offers many advantages. In this case the system incorporates a user-associated database (28). This is a database comprising information generated by the user, either manually or through an automated system. At its simplest, the user may maintain the user-associated database (28) by hand. Preferably, however, it is maintained with the use of a stock-monitoring device (30) in the user's possession. For example, a recent entry to the market is the so-called "intelligent fridge", a refrigerator capable of maintaining a database of the foodstuffs stored within it. (For example, the refrigerator may be provided with a means of scanning barcodes on food items, or the user may manually identify food items to the refrigerator, or the refrigerator may comprise means of obtaining information from RFID tags in food packaging).

The provision of a user-associated database (28) allows for the information provided to the user by the system to take account not only of the product (6) weighed and information obtained from the store-associated database (26), but also of information such as the products already possessed by the user. For example, a user possesses an intelligent fridge (30) and in using it generates a user-associated database (28). This database may be stored on the intelligent refrigerator (30). Alternatively, it may be stored on a computing device associated with the intelligent refrigerator (30). (This computing device might be the portable computer device (12) associated with the system of the present invention.) Alternatively, it may be transmitted to and stored in a store-associated database (26) via an application installed on the refrigerator, or on a computing device associated with the refrigerator (30). (Indeed, the user-associated database (28) may be nothing more than a set of user-generated data stored on the store-associated database (26).)

In this food-based example, the user weighs a food item on the scale (2) and data is transferred between the scale (2), store-associated database (26) and portable computer device (12) as usual. In addition to this, the scale (2), or the store-associated database (26) or the portable computer device (12) (or several or all three of these) communicates with the user-associated database (28) in order to obtain additional data. This data on what foodstuffs the user already possesses at home allows for the provision of more detailed recipe information; recipe options may, for instance, note which ingredients the user already possesses at home. In addition, if the user-associated database (28) comprises data on when the various foods held at the user's home should be used by, the recipes presented can take that into account. The user may have pre-loaded into the user-associated database (28) a list of meals to be prepared over the coming days; the system may provide stock information on the key ingredients of those meals and suggest secondary products to enhance them. If the user-associated database (28) notes that the user is low or out of a particular staple item a warning to the effect could be presented on the portable computer device (12) or scale (2). The user-associated database (28) may keep a log of the user's shopping habits and note favoured products, and (for example) highlight them when they are on sale.

Although FIGS. 4 and 5 show the user-associated database (28) as communicating directly with the portable computer device (12), it is equally possible that the user-associated database (28) could communicate via the store-associated database (26) or via the scale (2). This may require the user to provide access permission to allow external data connections originating from the store-associated database (26) or scale (2).

The invention claimed is:

1. A system comprising a weighing scale within a store and a store-associated database, characterised in that the system further comprises a portable computer device in communication with the database, wherein the scale includes a weighing pan for receiving a product to be weighed and a display device for visually displaying weigh information, wherein the portable computer device also includes a display for displaying additional data received from the store-associated database, wherein the store-associated database receives weighed product data from the weighing scale or the portable computer device and retrieves and sends to the portable computer device additional data regarding one or more other products in the store that are available for purchase.

2. System according to claim 1 wherein the portable computer device is additionally in communication with the scale.

3. System according to claim 2, wherein communication between the scale and the portable computer device is achieved via the portable computer device scanning an optical code or machine readable text displayed on the display device of the scale.

4. System according to claim 1 wherein the portable computer device communicates with the store-associated database via a telecommunications network, or an internet connection, or a wireless communications protocol.

5. System according to claim 2 wherein the portable computer device communicates with the store-associated database via the weighing scale.

6. System according to claim 1 further comprising an indoor positioning system.

7. System according to claim 1 wherein the portable computer device is a mobile telephone, tablet computer, laptop, or a computing device worn on the body.

8. System according to claim 1 further comprising a user-associated database.

9. A method of using a system that includes an in-store weighing scale with a display device, a store database and a portable computer device in communication with the store database, the portable computer device also including a display, the method including the following steps:
- weighing a product on the scale and inputting product type data into the scale via a scale input device;
- communicating product weight data and product type data for the product from the scale to the store database; and
- communicating data based on the product type data and product weight data sent to the store database from the store database to a user of the system via the portable computer device;
- wherein the data communicated from the store database to the user via the portable computer device includes a store map indicating a position of the user in the store and a position of another product in the store that is available for purchase by the user and that is associated with the product type data in the store database; and
- displaying the store map on the display of the portable computer device.

10. A method according to claim 9 comprising an additional step of accessing and obtaining data from a user database.

11. A method of using a system that includes an in-store weighing scale with a display device, a store database and a portable computer device in communication with the store database, the portable computer device also including a display, the method including the following steps:
- weighing a product on the scale and inputting product type data into the scale via a scale input device and displaying on the display device of the scale a scannable code or scannable text that comprises product type data;
- the portable scanning device scanning the scannable code or scannable text and communicating product type data for the product to the store database;
- identifying additional data in the store database that is associated with the product type data;
- communicating the additional data from the store database to the portable computer device; and
- displaying the additional data on the display of the portable computer device.

12. The method of claim 11 wherein the additional data communicated from the store database to the portable computer device includes a store map indicating both a position of the user in the store and a position of another product in the store that is available for purchase by the user and that is associated with the product type data in the store database.

13. The method of claim 12 comprising an additional step of accessing and obtaining data from a user database.

* * * * *